Jan. 13, 1942.  H. WARP  2,270,096
WINDOWPANE FOR POULTRY HOUSES
Filed July 26, 1939
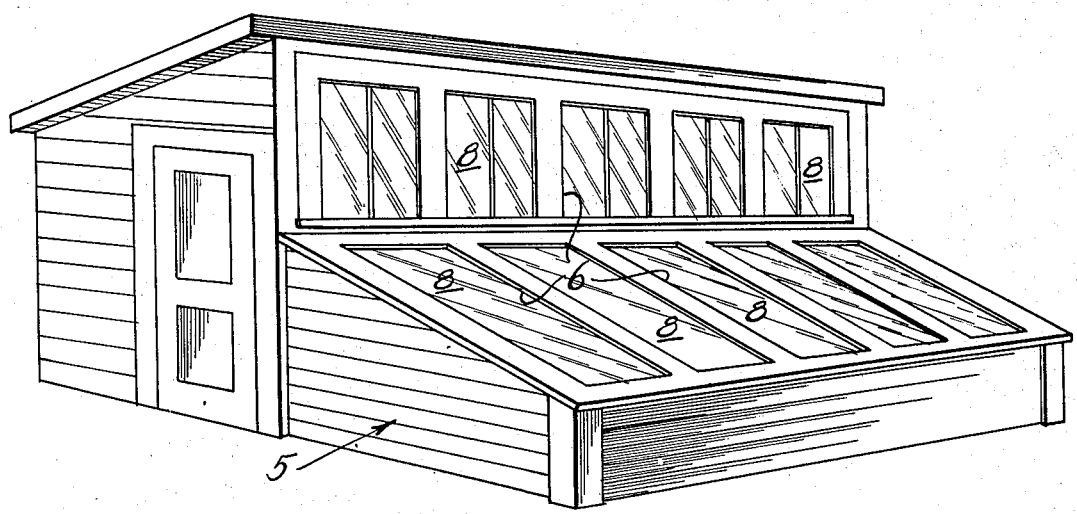
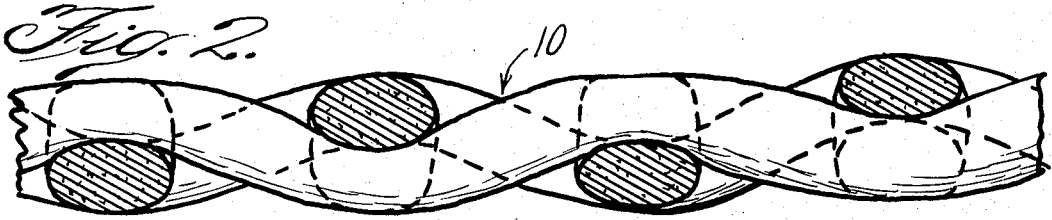
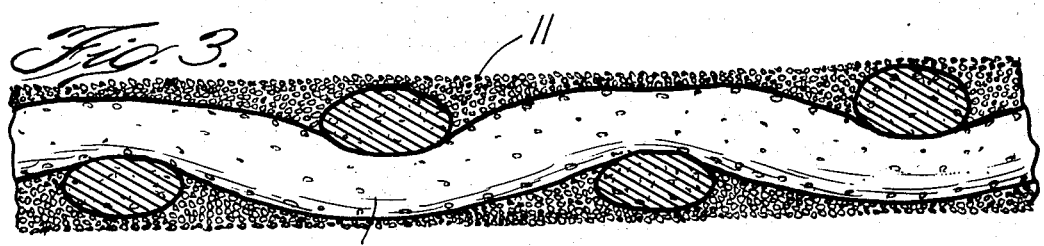
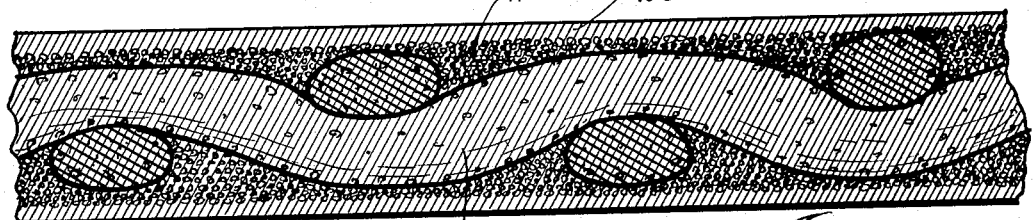
Inventor:
Harold Warp
By Ernest A. Wegner
his Atty.

Patented Jan. 13, 1942

2,270,096

UNITED STATES PATENT OFFICE 2,270,096

WINDOWPANE FOR POULTRY HOUSES

Harold Warp, Chicago, Ill.

Application July 26, 1939, Serial No. 286,636

7 Claims. (Cl. 88—109)

The invention relates generally to a sheet material and to the method of making a sheet material for use as panes in the windows or other light admitting openings of poultry houses.

It is a trait or habit of poultry, particularly chickens, continually to peck at any bloody spot that may appear on a member of the flock. This trait is commonly known in the trade as cannibalism. Among chickens, particularly baby chicks, especially during the early stages when they are confined in large numbers to the comparatively small area of brooder houses, cannibalism is a serious problem to poultry men, and each year results in losses running into the hundreds of thousands of dollars throughout the country. How to prevent such losses from cannibalism has long been a problem for which poultry men have been seeking a solution, but which as yet has not been satisfactorily solved. This problem is particularly difficult of solution because of the numerous complicating factors involved, such as the impossibility of individual treatment because of the number of individual cases that would have to be treated, and because frequently the injured chicken is not discovered until after it is too late to save the chicken.

Because of the complicating factors, it has been found that seeking to prevent cannibalism rather than seeking to cure the members of the flock injured in that way is the more logical approach to a solution of the problem. This approach involves mass treatment of the entire flock and thus presents the additional problem of providing a suitable treatment which may be easily and economically administered and which at the same time will not prove harmful to the chickens.

It is a general object of the invention, therefore, to provide a new and improved means for the prevention of cannibalism among poultry, which is easily and economically employed and which is not merely not harmful but is actually beneficial to the general health and growth of the poultry.

A more particular object of the invention is to provide a translucent sheet material of unique construction adapted to be employed as a pane in the light admitting openings of a poultry house, the material being of a character such that the light admitted to the poultry house through the openings causes blood to appear neutral or colorless, and the material at the same time admitting the health and growth promoting rays of the sun.

Another object is to provide a highly translucent, ultra-violet ray transmitting, paraffin impregnated and coated cloth having a light-fast blood-red color of such shade that it transmits a light neutralizing the color of blood or renders blood substantially colorless when seen in that light.

Other objects and advantages will become apparent form the following detailed description taken in connection with the accompanying drawing, in which:

Fig. 1 is a perspective view of a poultry house embodying the features of my invention.

Fig. 2 is a cross sectional view, enlarged in the order of 100 times, of the material forming the panes of the poultry house and showing the material in an early stage in its manufacture.

Fig. 3 is a view similar to Fig. 2, but showing the material in a later stage in its manufacture.

Fig. 4 is a view similar to Fig. 2 but showing the material in a still later stage of its manufacture.

For purposes of disclosure, the invention is shown embodied in a poultry house 5 for which purpose it was specifically designed and intended. The house 5 is of typical design and construction, having numerous windows or other light admitting openings 6.

As previously indicated generally, my invention contemplates prevention of cannibalism rather than treatment and cure of the members of the flock injured as a result of cannibalism. Such prevention, of course, involves treatment of the entire flock. In accordance with the present invention, this treatment is easily and conveniently administered in that it consists of providing a condition or environment within the poultry house which counteracts the inherent trait of poultry, and of chickens in particular, which results in cannibalism. By means of my invention, more particularly, the light within the poultry house is caused to be of such character that blood is rendered neutral or colorless.

To that end, I have conceived of a unique, translucent material 7 to be employed as panes 8 in all of the windows or other light admitting openings 6 of the poultry house 5. This material has a blood-red color of such shade that the daylight transmitted therethrough causes blood on any object within the poultry house to appear neutral or colorless. In order that this method be effective, the windows or other light admitting openings 6 must be kept closed at all times, which would be most undesirable were ordinary window glass or other material preventing the passage of the ultra-violet and infra-red rays of the sun to be used. Herein, however, the material 7 is of such construction that a certain percentage of these health giving and growth promoting rays of the sun are transmitted, thus making possible the use of this material for the prevention of cannibalism with not only no harmful or detrimental effects, but with actual beneficial effects.

This unique window pane material and the method of making the same will now be set forth in greater particularity. As a base for my material, I employ a cloth or fabric 10 (see Fig. 2), preferably cotton, woven in the usual manner but preferably having approximately sixty or more threads to the inch each way. I have found that the ultra-violet ray transmission is greater with this number of threads than it is with a smaller number of coarser threads. The cloth 10 is bleached in the usual way, such as by immersing or steeping the same first in a tank containing a solution of caustic soda and thereafter in a chlorine bath. After being bleached in this manner, the cloth 10 is calendered in well known manner, such as by running the cloth over or through a series of calendering rollers of any well known construction.

After the cloth has been calendered, it is next filled with a suitable filler that will not prevent the passage of ultra-violet rays. While the present invention does not relate to the particular filler employed, it has been found that a filler consisting largely of some mineral compound such as mica or French talc is preferable. This mineral compound may be mixed with starch to provide a certain stiffness to the cloth, and with flour to provide a carrier or binder for the mineral compound though the latter two ingredients may be entirely omitted or ingredients of like character substituted. The resultant filler is mixed with water until it has the consistency of mortar or plaster, and the cloth 10 is then run through a vat containing this filler. Care should be exercised to be certain that the filler fills all of the interstices between the threads of the cloth, as well as the cells in the thread themselves, and that it is applied in a uniform manner. The filled cloth is then passed over suitable rollers or cylinders for drying, and then appears as shown in Fig. 3 wherein the filler is designated by the reference character 11.

As previously stated, my window pane material 7 has a blood-red color of such shade that the resultant light within the house 5 causes blood to appear neutral or colorless and thus prevents cannibalism among the flock. It is necessary, of course, that the coloring matter employed not be of such a character as to cut out or prevent the transmission of the ultra-violet and infra-red rays of the sun, and at the same time this coloring matter should be light-fast in order that it might not fade after a limited exposure to the sun. I have found that a water soluble, aniline dye meets these requirements, and I have also found that the best results are obtained by applying this dye to the filled cloth.

Accordingly, the next step in the process of making the window pane material 7 consists in passing the filled cloth through a vat containing a blood-red, water soluble, aniline dye and treating the same while in the vat thoroughly to color each particle of the cloth as well as the filler. The dye should have about twice the strength normally used to produce a blood-red color and the filled cloth should be dyed to a shade deeper than blood-red, for it has been found that subsequent treatment of the cloth causes the hue or light cast by the cloth to be lighter than expected. Stated another way, the cloth should be dyed to a blood-red color of such shade that when the sunlight or daylight shines therethrough the resulting hue or light cast by the cloth within the house 5 will be such as will neutralize the color of the actual blood appearing on an injured member of the flock.

The next step in the manufacture of the material 7 is to impregnate and coat the filled and dyed cloth with a paraffin compound to make the same absolutely waterproof, air-tight, translucent, weather resistant, and durable. While the paraffin may be applied in a number of ways, I have found a particular method of applying the same to be most effective. This method consists of running the cloth through a bath of molten paraffin and while in the bath repeatedly subjecting the cloth to pressure. In this manner the paraffin is forced to penetrate to the very core of each individual fibre and also all air which may be trapped in the filled cloth is forced out and the space replaced with paraffin. In this way, the material not only is thoroughly impregnated and coated so as to be waterproof and weather resistant, but becomes so highly translucent as to be partially transparent. Preferably, a paraffin having a high melting point is employed, in order that the material will be able to withstand the high temperatures reached in the sun during the summer months. This coating of paraffin also protects and seals the dye in the cloth. The material now appears as shown in Fig. 4, with the reference character 12 indicating the paraffin impregnation and coating.

Should one wish to do so, it is possible to add a dye to the paraffin bath, in order that the paraffin impregnation and coating may also have a blood-red color. This dye will have to be an oil soluble dye and, while such dye is not nearly so light-fast as a water soluble, aniline dye, and thus could not be relied upon alone, as an auxiliary coloring it is perfectly permissible and even has certain advantages. However, this coloring of the paraffin in the bath is not necessary, for the dyeing of the filled cloth can be made sufficient to serve the purpose intended.

It is believed apparent from the foregoing that I have perfected a window pane material of unique construction which fills a long felt want, and which solves a problem which has long been a stumbling block to poultry men and to scientists seeking to aid the poultry men in this particular problem. In providing a material which causes a light transmitted to the interior of a poultry house to be of such character that it renders colorless or neutralizes the color of red blood, which material at the same time transmits the health giving and growth promoting rays of the sun, so that all light admitting openings may be covered and maintained closed at all times with this material, I have perfected a convenient mass treatment for the poultry which prevents cannibalism. Thus the use of my material, in addition to preventing cannibalism, promotes growth and general health because it admits the rays of the sun essential for those purposes, which rays are prevented from entering the poultry house when ordinary glass is employed in the windows. Moreover, my material is of low cost and is easily and conveniently employed without necessitating change in the construction of poultry houses and when applied results in a treatment for cannibalism which does not require handling of the members of the flock, or constant attention or repeated application.

I claim as my invention:

1. A pane for windows or other light admitting openings in poultry houses comprising a woven cloth base having approximately sixty threads to the inch each way, an ultra-violet ray transmitting filler applied to said cloth to fill the interstices between the threads thereof as well as interstices in the threads themselves, said cloth and said filler being dyed blood-red with a water soluble ultra-violet ray transmitting aniline dye so as to produce in a poultry house to which it is applied a light causing blood to appear substantially neutral or colorless, and a paraffin impregnation and coating for rendering the treated cloth translucent and weather proof.

2. A sheet material for use as a pane in the windows and other light admitting openings in poultry houses comprising a cloth base, an ultra-violet ray transmitting filler applied to said cloth base completely filling the interstices in the cloth, said cloth and said filler being dyed red with a water soluble ultra-violet ray transmitting aniline dye so as to cast a blood-red light neutralizing the color of blood on any object within the house, and a paraffin impregnation and coating for rendering the material translucent and water proof.

3. A sheet material for use as a pane in the windows and other light admitting openings in poultry houses comprising a cloth base, an ultra-violet ray transmitting filler applied to said cloth base completely filling the interstices in the cloth, said cloth and said filler being dyed red with a water soluble ultra-violet ray transmitting aniline dye so as to cast a blood-red light neutralizing the color of blood on any object within the house, and a paraffin impregnation and coating for rendering the material translucent and water proof including a blood-red dye soluble in the paraffin.

4. A sheet material for use as a pane in the windows and other light admitting openings in poultry houses comprising a cloth having its interstices filled with a mineral filler ultra-violet ray transmitting, said cloth and filler being dyed red with an ultra-violet ray transmitting aniline dye, so as to prevent cannibalism among chickens housed in a house to which the material has been applied by neutralizing the color of blood on any object within the house, and a paraffin impregnation and coating for rendering the material translucent and water proof.

5. A sheet material for use as a pane in the windows and other light admitting openings in poultry houses comprising a cloth base, an ultra-violet ray transmitting filler applied to said cloth base completely filling the interstices in the cloth, said cloth and said filler being dyed red with a water soluble ultra-violet ray transmitting aniline dye, and a paraffin impregnation and coating for rendering the material translucent and water proof.

6. A sheet material for use as a pane in the windows and other light admitting openings in poultry houses comprising a cloth base, an ultra-violet ray transmitting filler applied to said cloth base completely filling the interstices in the cloth, said cloth and said filler being red so as to cast a red light neutralizing the color of blood on any object within the house, and a paraffin impregnation and coating for rendering the material translucent and water proof.

7. As an article of manufacture, a flexible sheet material comprising, a cloth base, a filler for the interstices of said cloth base, and an impregnation and coating of paraffin for rendering the material translucent and water proof, said cloth and filler when impregnated being ultra-violet ray transmitting, and at least one of said cloth base, said filler or said paraffin being dyed red of a shade which will render unnoticeable blood or wounds on chickens confined in a house having this material covering the light admitting openings.

HAROLD WARP.